United States Patent [19]

Gaiser

[11] 4,311,007

[45] Jan. 19, 1982

[54] MASTER CYLINDER AND PROPORTIONING VALVE THEREFOR

[75] Inventor: Robert F. Gaiser, Stevensville, Mich.

[73] Assignee: The Bendix Corporation, Southfield, Mich.

[21] Appl. No.: 80,823

[22] Filed: Oct. 1, 1979

[51] Int. Cl.$^3$ .............................................. B60T 11/20
[52] U.S. Cl. ...................................... 60/562; 60/568; 60/582; 60/589
[58] Field of Search ................. 60/561, 562, 574, 589, 60/550, 552, 553, 554, 568, 582

[56] References Cited

U.S. PATENT DOCUMENTS

| | | | |
|---|---|---|---|
| 2,332,301 | 10/1943 | Cox | 60/562 |
| 3,140,587 | 7/1964 | Stelzer | 60/562 |
| 3,355,887 | 12/1967 | Balster | 60/562 |
| 3,698,190 | 10/1972 | Miyai | 60/562 |

Primary Examiner—Abraham Hershkovitz
Attorney, Agent, or Firm—Paul David Schoenle; Ken C. Decker

[57] ABSTRACT

A master cylinder provides a housing defining a reservoir and movably carrying a pair of pistons within a bore in communication with the reservoir. The pair of pistons cooperate with the housing to substantially define a pair of pressure chambers which communicate with respective brake circuits. One of the pistons forms a cavity to receive a reaction piston and the one piston also carries a proportioning valve. The reaction piston forms an auxiliary chamber within the one piston and the proportioning valve is exposed to the auxiliary chamber. The reaction piston extends outwardly into one of the pressure chambers to engage the housing and the valve member is responsive to the fluid pressure in the other pressure chamber to control fluid communication between the auxiliary chamber and the reservoir. When the valve member closes the auxiliary chamber during a brake application the movement of the one piston relative to the reaction piston increases fluid pressure in the auxiliary chamber to oppose movement of the one piston. Therefore, the increase of fluid pressure within the one pressure chamber is restricted so as to proportion fluid communication from the one pressure chamber.

12 Claims, 2 Drawing Figures

MASTER CYLINDER AND PROPORTIONING VALVE THEREFOR

BACKGROUND OF THE INVENTION

A master cylinder is utilized in a vehicle brake system to generate fluid pressure during a brake application. The fluid pressure is communicated to front and rear brake assemblies to effectuate braking for the vehicle. Generally, a housing includes a reservoir to retain the brake fluid and movably supports a pair of pistons to develop fluid pressure in a primary pressure chamber and a secondary pressure chamber. As one of the pressure chambers is in communication with the rear brake assembly it is desirable to proportion the communication of fluid pressure to this rear brake assembly to avoid rear wheel lockup during braking.

In the past a proportioning valve was responsive to the fluid pressure within the one pressure chamber to restrict fluid communication to the rear brake assembly in response to increasing fluid pressure therein. The proportioning valve was also disposed within one of the pistons as illustrated in my prior U.S. patent application Ser. Nos. 936,272, now U.S. Pat. No. 4,249,379 and 14,449, now abandoned, to incorporate the proportioning mechanism within the master cylinder, thereby saving space in an engine compartment.

In view of the number of parts disposed within the one piston and also because of the increasing reduction in the size of the one piston it is desirable to provide a master cylinder with a simple proportioning valve arrangement.

SUMMARY OF THE INVENTION

A master cylinder includes a housing with a reservoir and a bore for movably receiving a pair of pistons. The pistons cooperate with the housing to substantially form a pair of pressure chambers which communicate with respective brake circuits. The pair of pistons are movable during a brake application to pressurize fluid within each pressure chamber for communicating fluid pressure to front and rear brake assemblies.

The one piston which pressurizes fluid in the one pressure chamber communicating with the rear brake assembly also carries a proportioning valve. The one piston forms a cavity to movably receive a reaction piston. The reaction piston cooperates with the one piston to form a variable volume auxiliary chamber in fluid communication with the proportioning valve. An opening in the one piston receives a portion of the reaction piston extending outwardly of the one piston into the one pressure chamber and in engagement with the housing. A spring extending between the reaction piston and the one piston biases the one piston to a rest position. A pair of passages in the one piston communicate the reservoir to both sides of the reaction piston and one of the passages intersects the proportioning valve.

During a brake application, the one piston is movable relative to the housing and the reaction piston to increase the fluid pressure within the one pressure chamber. At the same time the other piston is movable to increase the fluid pressure within the other pressure chamber. When a predetermined pressure level is reached in the other pressure chamber, the proportioning valve is movable to close commnication between the reservoir and one side of the reaction piston. Further movement of the one piston increases fluid pressure within the auxiliary chamber to oppose movement of the one piston, even though the other piston continues to move to increase fluid pressure in the other chamber. If the force by the fluid pressure within the auxiliary chamber acting against the proportioning valve is greater than the force by the fluid pressure within the other chamber acting against the proportioning valve, the proportioning valve is movable to momentarily vent the auxiliary chamber to the reservoir to reduce the fluid pressure therein, whereupon the proportioning valve returns to its closed position. Consequently, above the predetermined pressure level, the fluid pressure developed in the one pressure chamber in response to movement of the one piston is only a proportion of the fluid pressure developed in the other pressure chamber.

If the other pressure chamber or its corresponding brake circuit should fail, the proportioning valve is responsive to a reduction in fluid pressure in the other pressure chamber to maintain the auxiliary chamber vented to the reservoir. As a result there will be no fluid pressure in the auxiliary chamber opposing movement of the one piston.

It is an object of the present invention to incorporate a proportioning valve in a piston which develops fluid pressure in a pressure chamber. The proportioning valve is responsive to fluid pressure in another pressure chamber to control fluid pressure in an auxiliary chamber opposing movement of the piston.

It is a further object of the present invention to provide a bypass condition to prevent operation of the proportioning valve when the one pressure chamber fails to develop a predetermined pressure.

DETAILED DESCRIPTION

Figure 1:
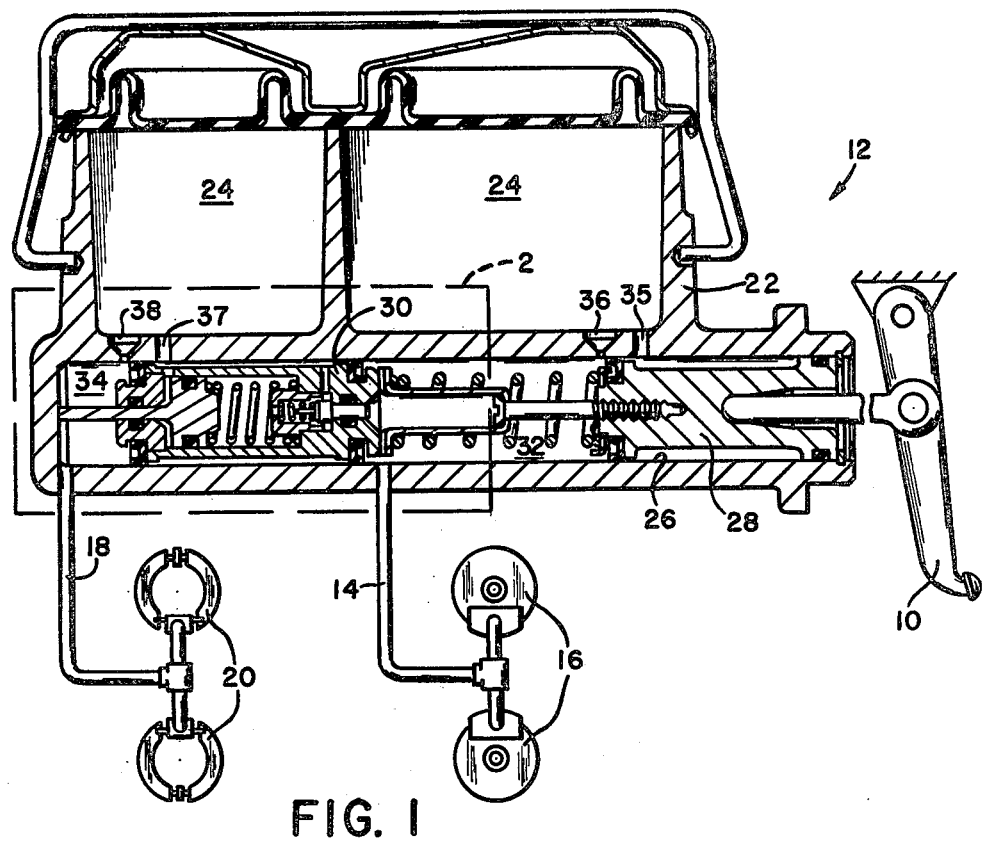
FIG. 1 is a cross-sectional view of a master cylinder in a brake system constructed in accordance with the present invention.
Figure 2:
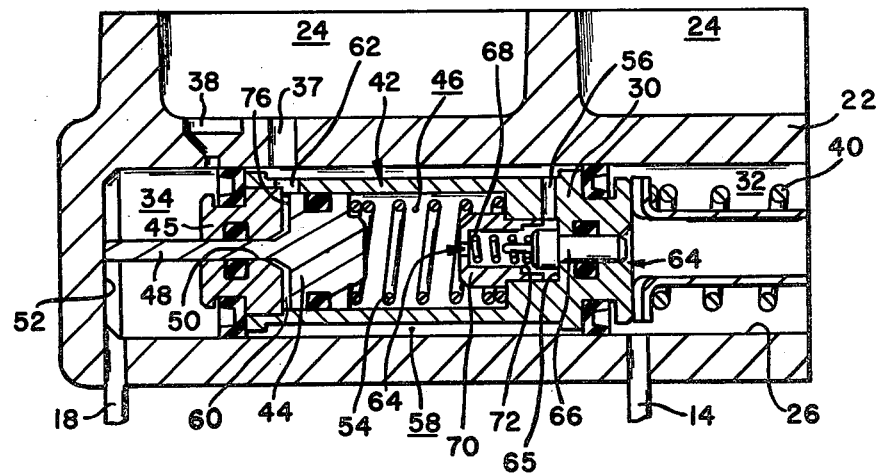
FIG. 2 is an enlarged view of the secondary piston encircled in FIG. 1.

In the brake system of FIG. 1, a brake pedal 10 is connected to a master cylinder 12 by any suitable means. The master cylinder 12 communicates via a conduit 14 with a front brake assembly 16 and also communicates via a conduit 18 with a rear brake assembly 20. The master cylinder 12 includes a housing 22 substantially defining a split reservoir 24 and a bore 26 within the housing 22 movably carries a pair of pistons, generally referred to as a primary piston 28 and a secondary piston 30. The primary piston 28 cooperates with the housing to define a primary pressure chamber 32 communicating with conduit 14 and the secondary piston cooperates with the housing to define a secondary pressure chamber 34 communicating with conduit 18. In addition, ports 36 and 38 communicate the reservoir 24 with the pressure chambers. Fill holes 35 and 37 communicate the reservoir 24 with the bore 26. A spring 40 extending between the pair of pistons causes the secondary piston 30 to move to the left in response to leftward movement of the primary piston 28.

In accordance with the invention, the one piston 30 is provided with a cavity 42 to movably and sealingly receive a reaction piston 44. The reaction piston cooperates with the piston 30 to form a variable volume auxiliary chamber 46 and a portion 48 of the piston extends outwardly from the piston 30 via an opening 50 into the one pressure chamber 34 to engage an end wall 52 of the bore 26. A spring 54 within the auxiliary chamber 46 biases the piston 30 to a rest position. A first radial passage 56 within piston 30 communicates the auxiliary chamber 46 with the reservoir 24 via a clearance 58 between an intermediate portion of piston 30 and the wall of bore 26 and via fill hole 37. A second radial passage 62 communicates the reservoir with the space 60 between the left side of the reaction piston 44 and a plug 45 forming the opening 50. The first radial passage 56 intersects a longitudinally extending opening 64 in the piston 30 and a proportioning valve 66 is biased via spring 68 to a rest position within the opening 64. A seat and spring retainer 70 is attached to the inner end of piston 30 adjacent opening 64. The retainer 70 defines a seat 72 which is larger than the diameter of opening 64 and is normally spaced from the proportioning valve 66.

MODE OF OPERATION

In the rest position the portion 48 of reaction piston 44 is abutting the end wall 52. Moreover, the spring 54 biases the piston 30 to the right until the left side 76 of reaction piston 44 is abutting the piston 30. For clarity the piston 30 is shown slightly disposed to the left of the rest position so that the space 60 is illustrated. The spring 68 also maintains the proportioning valve 66 in abutment with a shoulder 65 defined by a step in opening 64 so that fluid from the reservoir 24 is free to communicate with the auxiliary chamber 46 via fill hole 37, clearance 58, passage 56, and opening 64.

During initial braking the piston 28 is moved to the left to trap and pressurize fluid within chamber 32. The pressurized fluid within chamber 32 together with the contraction of spring 40 acts against the piston 30 to move the same to the left. The movement of piston 30 causes the reaction piston 44 to move within cavity 42 so as to contract the auxiliary chamber 46. Fluid within the auxiliary chamber is forced outwardly therefrom to the clearance 58. A portion of this fluid is returned to the reservoir while the remaining portion is communicated to the space 60 on the left side of reaction piston 44, via passage 62 as the left side is moving away from the left end plug 45 of piston 30 to expand the space 60. Moreover, the piston 30 is movable to trap and pressurize fluid within chamber 34. Consequently, fluid pressure within chambers 32 and 34 is communicated to brake circuits or assemblies 16 and 20 to initially effect braking.

When a predetermined pressure level is reached in chamber 32, the force of this fluid pressure acting on the proportioning valve 66 across the diameter of opening 64 adjacent chamber 32 overcomes the force of spring 68 to move the proportioning valve into engagement with the seat 72. Therefore, further movement of the reaction piston 44 within cavity 42 contracts the auxiliary chamber 46 to increase the fluid pressure therein. The fluid pressure in chamber 46 acts against the piston 44 and the piston 30. Because the piston 44 is abutting the end wall 52, the fluid pressure within chamber 46 acts against the piston 30 to oppose the force of the spring 40 and of the fluid pressure within chamber 32. Consequently, the movement of the piston 30 is retarded so that the fluid pressure developed in chamber 34 is less than that developed in chamber 32 to reduce the fluid pressure communicated to the rear brake assembly 20 via conduit 18.

Above the predetermined pressure level in chamber 32, the proportioning valve is movable in response to increasing fluid pressure within chamber 46 to move away from seat 72, thereby venting a portion of the fluid pressure from the chamber 46 to the reservoir 24. When the vented chamber 46 reduces the fluid pressure therein, the proportioning valve is again biased by the fluid pressure within chamber 32 toward engagement with the seat 72 to continue proportioning the fluid pressure within chamber 34.

When braking is terminated, the spring 40 biases the piston 28 to return to its rest position and the spring 54 biases the piston 30 to return to its rest position. The fluid within the space 60 between the left plug 45 of piston 30 and the left side 76 of piston 44 is returned to the clearance 58 via passage 62. The reduction of fluid pressure in chamber 32 causes the proportioning valve to move away from seat 72 in response to the force of spring 68 and the force of fluid pressure within chamber 46.

The difference in fluid pressure within chambers 32 and 34 during proportioning is controlled by the spring constant of spring 68, the area of opening 64 adjacent chamber 32 and the area across seat 72.

If the conduit 14 or the pressure chamber 32 should fail for any reason to develop adequate pressure during a brake application, the proportioning valve 66 would remain in abutment with shoulder 64. Consequently, the auxiliary chamber 46 would remain vented to the reservoir so that the piston 30 would not be subjected to a force within auxiliary chamber 46 opposing movement of the piston. The piston 30 would be movable by the contraction of spring 40 to develop fluid pressure within chamber 34 due to the inoperative condition of the proportioning valve 66. In other words, no proportioning function occurs when the pressure chamber 32 or its communication conduits is failing to develop or retain fluid pressure during a brake application. This bypass of the proportioning valve 66 is totally dependent on the fluid pressure developed in chamber 32, even though the chamber 34 is the chamber which is directly affected when proportioning occurs.

Although the plug 45 is illustrated as a separate part it is conceivable that the plug could be integral with the piston 30. In addition, the retainer 70 could also be integral with the piston 30.

I claim:

1. A master cylinder comprising a housing defining a reservoir and having a bore for movably receiving a pair of pistons, said pair of pistons cooperating with the housing to substantially define a primary pressure chamber and a secondary pressure chamber which are in fluid communication with respective brake circuits, one of said pair of pistons substantially defining an auxiliary chamber for movably receiving a reaction piston, a valve member carried by said one piston, said valve member being biased to a first position normally opening fluid communication between said reservoir and said auxiliary chamber, and said valve member being movable in response to fluid pressure in said primary pressure chamber to close the communication between said reservoir and said auxiliary chamber whereby the reaction piston cooperates with said one piston to increase fluid pressure in said auxiliary chamber to oppose movement of said one piston.

2. The master cylinder of claim 1 in which said housing bore leads to an end wall and said reaction piston is engageable with said end wall.

3. The master cylinder of claim 1 in which a first resilient member is disposed between said pair of pistons and a second resilient member is disposed within said auxiliary chamber in engagement with said reaction piston and said one piston.

4. The master cylinder of claim 1 in which said one piston includes an opening leading to said secondary pressure chamber and said reaction piston includes a portion extending through said opening.

5. The master cylinder of claim 1 in which said reaction piston cooperates with said housing to remain substantially stationary within said auxiliary chamber even when said one piston is moving within said housing bore.

6. A master cylinder comprising a housing movably supporting a pair of pistons within a bore, the pair of pistons cooperating with the housing to substantially define a pair of pressure chambers, a reaction piston cooperating with one of the pistons to substantially define an auxiliary chamber, said one piston being movable to develop fluid pressure within one of said pressure chambers, a valve member cooperating with said reaction piston in response to fluid pressure within the other of said pair of pressure chambers to resist movement of said one piston during a brake application in response to fluid pressure within said other pressure chamber, said valve member being responsive to a failure mode for said other pressure chamber to permit free movement of said one piston during the brake application, said housing substantially defining a reservoir, said valve member being normally biased to a first position opening communication between said auxiliary chamber and said reservoir, said valve member being movable in response to fluid pressure within said other pressure chamber to a second position closing communication between said reservoir and said auxiliary chamber and said valve member being responsive to the failure mode to return to its first position.

7. For a vehicle braking system, a master cylinder of the type having a housing defining a bore therewithin having an end wall, a reservoir communicating fluid into said bore, a pair of pistons reciprocably received in said bore and sealingly cooperating with said housing to define a pair of pressure chambers communicating with respective vehicle braking assemblies via a pair of outlets, resilient means for yieldably biasing said pair of pistons to nonbraking positions, said pair of pistons moving to braking positions in response to an operator input force to trap and pressurize fluid in said pair of pressure chambers, and means for proportioning fluid pressure communication to one of said pair of braking assemblies as a function of fluid pressure communication to the other of said pair of braking assemblies, the improvement wherein said pressure proportioning means includes one of said pair of pistons defining an auxiliary bore therewithin and an axially extending opening communicating said auxiliary bore with one of said pair of pressure chambers, a reaction piston movably received in said auxiliary bore, said reaction piston including a portion sealingly extending through said opening and engaging said end wall to restrain movement of said reaction piston, said reaction piston further sealingly cooperating with said one piston to bound an auxiliary chamber contracting in response to movement of said one piston to said braking position, said one piston defining a clearance communicating with said reservoir, and passage means for communicating said auxiliary chamber with said reservoir via said clearance, a pressure responsive valve member in a first position opening said passage means, said valve member being exposed to the fluid pressure levels in the other of said pair of pressure chambers and in said auxiliary chamber, said valve member shifting to a second position closing said passage means in response to a determined fluid pressure level in said other pressure chamber to trap and pressurize fluid in said auxiliary chamber to resist movement of said one piston in response to said input force, said valve member opening and closing to meter pressurized fluid from said auxiliary chamber to said reservoir in response to the pressure level of pressurized fluid in said other pressure chamber increasing above said determined level.

8. The invention of claim 7 wherein said valve member defines a first area exposed to said other pressure chamber and a second area exposed to said auxiliary chamber, said second area being larger than said first area.

9. In a master cylinder, a piston movable in response to a fluid pressure to effectuate braking, said piston defining therein an auxiliary chamber contracting in response to movement of said piston effectuating braking, passage means for communicating said auxiliary chamber with a fluid reservoir, and valve means exposed and responsive to said fluid pressure for in a first position opening said passage means to vent said auxiliary chamber to said reservoir during a brake application, said valve means shifting to a second position closing said passage means in response to a determined level of said fluid pressure to trap and pressurize fluid within said auxiliary chamber to resist movement of said piston effectuating braking, said valve member shifting between said first and said second positions in response to said fluid pressure increasing above said determined pressure level.

10. The invention of claim 9 wherein said one piston defines an axially extending opening therein, a reaction member slidably received within said auxiliary chamber including a portion extending axially through said opening and cooperating with a housing receiving said piston to restrain movement of said reaction member, said reaction member sealingly cooperating with said piston to bound said auxiliary chamber.

11. The invention of claim 10 wherein said auxiliary chamber receives a resilient member extending between said piston and said reaction member, said resilient member yieldably biasing said piston toward a nonbraking position.

12. The invention of claim 9 wherein said valve means includes a valve member having a stem which is movably and sealingly received in an opening communicating said passage means with said fluid pressure, said valve member including a head sealingly cooperable with a valve seat to close said passage means in said second position of said valve means, said valve member defining a greater area at said valve seat which is exposed to said auxiliary chamber than the area defined by said stem which is exposed to said fluid pressure.

* * * * *